United States Patent [19]
Carter

[11] Patent Number: 5,457,612
[45] Date of Patent: Oct. 10, 1995

[54] BICYCLE REAR LIGHTING SYSTEM

[76] Inventor: Scot Carter, 46 S. Hawthorn, Mundelein, Ill. 60060

[21] Appl. No.: 129,761

[22] Filed: Sep. 30, 1993

[51] Int. Cl.$^6$ ........................................ B62J 6/04
[52] U.S. Cl. .................. 362/72; 362/800; 362/191; 362/251; 362/396
[58] Field of Search .................. 362/800, 72, 190, 362/191, 249, 251, 396; 340/432

[56] References Cited

U.S. PATENT DOCUMENTS

| | | | |
|---|---|---|---|
| 4,395,603 | 7/1983 | Lauzier | 200/61.87 |
| 4,417,783 | 11/1983 | LeVantine | 350/99 |
| 4,586,021 | 4/1986 | Nickols | 340/134 |
| 4,586,113 | 4/1986 | Tsuyama | 362/72 |
| 4,623,954 | 11/1986 | Schott et al. | 362/72 |
| 4,654,629 | 3/1987 | Bezos et al. | 340/87 |
| 4,656,564 | 4/1987 | Felder | 362/72 |
| 4,716,502 | 12/1987 | Schott et al. | 362/72 |
| 4,733,335 | 3/1988 | Serizawa et al. | 362/80 |
| 4,760,372 | 7/1988 | Watson | 340/134 |
| 4,787,014 | 11/1988 | Wodder et al. | 362/78 |
| 4,792,882 | 12/1988 | Guevremont | 362/72 |
| 4,833,444 | 5/1989 | Wisniewski | 340/432 |
| 4,845,599 | 7/1989 | Lievin | 362/72 |
| 4,860,177 | 8/1989 | Simms | 362/72 |
| 4,875,142 | 10/1989 | Spector | 362/72 |
| 4,896,138 | 1/1990 | Nickols | 340/479 |
| 4,899,023 | 2/1990 | Shu-Hwa | 200/61.12 |
| 4,920,464 | 4/1990 | Balentine, III | 362/72 |
| 4,949,228 | 8/1990 | Lin et al. | 362/72 |
| 5,015,918 | 5/1991 | Copeland | 315/76 |
| 5,029,055 | 7/1991 | Lindh | 362/191 |
| 5,175,528 | 12/1992 | Choi et al. | 340/331 |
| 5,313,187 | 5/1994 | Choi et al. | 362/800 |

FOREIGN PATENT DOCUMENTS

| | | | |
|---|---|---|---|
| 3832109 | 3/1990 | Germany | 362/72 |
| 2071301 | 9/1981 | United Kingdom | 362/72 |

*Primary Examiner*—Ira S. Lazarus
*Assistant Examiner*—Sara Sachie Raab
*Attorney, Agent, or Firm*—Thomas R. Vigil

[57] ABSTRACT

The bicycle rear lighting system comprises: a light emitting structure including a first linear array of two or more light emitting diodes which emit light along a first line; first mounting structure for mounting the light emitting structure underneath the rear edge of a bicycle seat; a source of electrical energy coupled to the light emitting structure; second mounting structure for mounting the source of electrical energy to the underside of the bicycle seat; a first switch coupled to the source of electrical energy and to the light emitting structure for connecting and disconnecting the source of electrical energy with the light emitting structure; and the array of two or more light emitting diodes being arranged closely adjacent to each other so that the diverging light beam from each light emitting diode overlaps the light beam from an adjacent light emitting diode thereby to provide a powerful, reinforced light beam along the first line.

20 Claims, 3 Drawing Sheets

BICYCLE REAR LIGHTING SYSTEM

BACKGROUND OF THE INVENTION

1. Field of the Invention

The present invention relates to a bicycle rear lighting system and more specifically to a bicycle rear lighting system which includes at least one row of light emitting diodes, LEDs which are arranged closely adjacent each other so that the respective light beams of the LEDs' overlap and reinforce each other to provide a bright light which can be readily seen by motorist approaching the bicycle from the rear.

Preferably the lighting system also includes a second row of LEDs also ranged closely adjacent each other to have overlapping reinforcing light beams, the second row of LEDs being arranged on a first line positioned to intersect a second line containing the first row of LEDs, and preferably are arranged so that the first line intersects the second line at an angle of approximately 90°.

Also, preferably, the lighting system includes a single LED which is mounted on the bicycle frame and is capable of being energized when the power in the batteries supplying voltage and current to the first row and/or the second row of LEDs is insufficient to energize the row or rows of LEDs but is sufficient to energize the single LED.

2. Description of the related art including information disclosed under 37 CFR §§1.97–1.99.

Heretofore a number of bicycle rear lighting systems have been proposed and examples of these previously proposed bicycle rear lighting systems are disclosed in the following U.S. Patents.

| U.S. Pat. No. | Patentee |
|---|---|
| 4,395,603 | Lauzier |
| 4,417,783 | Le Vantine |
| 4,586,021 | Nickols |
| 4,623,954 | Schott et al. |
| 4,586,113 | Tsuyama |
| 4,656,564 | Felder |
| 4,716,502 | Schott et al. |
| 4,760,372 | Watson |
| 4,787,014 | Wodder et al. |
| 4,792,882 | Guevremont |
| 4,833,444 | Wisniewski |
| 4,845,599 | Lievin |
| 4,860,177 | Simms |
| 4,875,142 | Spector |
| 4,896,138 | Nickols |
| 4,899,023 | Shu-Hwa |
| 4,920,464 | Balentine, III |
| 4,949,228 | Lin et al. |
| 5,029,055 | Lindh |
| 5,015,918 | Copeland |
| 5,175,528 | Choi et al. |

The Simms U.S. Pat. No. 4,860,177 teaches a bicycle safety light mounted which is to the seat column of a bicycle and which includes a housing mounting a plurality of light emitting diodes that are arranged in three horizontal rows and in ten vertical columns. Circuitry is provided in the housing for causing a constantly moving and converging pattern of light rows which visually direct and emphasize to a following viewer the center position of the rider and the bicycle. The control circuitry sequentially activates each light emitting diode in the array to produce the moving light pattern.

The Copeland U.S. Pat. No. 5,015,918 teaches the provision of red LEDs having sufficient brightness and efficiency to be employed as a bicycle tail lamp. The tail lamp is a steady flashing lamp and circuitry is provided for causing the LED of the lamp to flash.

The Lindh U.S. Pat. No 5,029,055 discloses a lamp including a reflector, batteries and a light emitting diode. Lindh teaches that one LED is hermetically encased between a glass that also serves as a reflector and a rear wall of the lamp. The light emitting diode is preferably a super ultrabright or high superbright LED.

The Choi et al. U.S. Pat. No. 5,175,528 teaches a flashing safety warning light in which a superluminescent light emitting diode light source is driven by an oscillatory drive signal at a visually imperceptible but highly efficient operating frequency.

Also of background interest, are two non-analogous U.S. Patents relating to vehicle lamps for automobiles or trains, they being: the Bezos et al. U.S. Pat. No. 4,654,629 and the Serizawa et al. U.S. Pat. No. 4,733,335 .

The non-analogous Bezos et al. U.S. Pat. No. 4,654,629 teaches a marker light for the trailing end of the rear car of a passenger, commuter, or freight train. The marker light includes arrays of LEDs and a lens arrangement. The LEDs are positioned with respect to the lenses of the right characteristics to provide a light of a required intensity and pattern.

More specifically, Bezos et al. teaches an array of light emitting diodes arranged to produce a light beam in a red-orange-amber color range with a minimum arc width of at least 15° on each side of a vertical center line and 5° on each side of a horizontal center line and an intensity on an axis of the beam of not less than 100 candela. To achieve this effect, a center group of LEDs in a line or array on a circuit board direct light perpendicularly outwardly from the circuit board while an array on one side and an array on the other side emit light at an angle to the circuit board toward the axis of the lamps in the center group.

The non-analogous Serizawa et al. U.S. Pat. No. 4,733,335 teaches a vehicular lamp particularly for use in an automobile, employing light emitting diodes providing good illumination efficiency. Light produced by the light emitting diodes is applied in the form of parallel beams to a front lens member by a condenser lens and the parallel light beams are diffused by a diffusion lens on the front lens member.

As will be described in greater detail herein after, the bicycle rear lighting system of the present invention provides an array of light emitting diodes which are positioned closely adjacent each other so that the light emanating from each diode will overlap and reinforce the light beam emitted from an adjacent LED. The linear array of light emitting diodes can be arranged in a generally horizontal line or a generally vertical line at the rear of a bicycle.

SUMMARY OF THE INVENTION

According to the present invention there is provided a bicycle rear lighting system for mounting to an underside of a bicycle seat adjacent a rear edge of the bicycle seat comprising: a light emitting structure including a first linear array of at least three light emitting diodes which emit light along a first line; a first mounting structure for mounting the light emitting structure underneath the rear edge of the bicycle seat; an electrical energy supply source coupled to the light emitting structure; a second mounting structure for mounting the electrical energy supply source to the underside of the bicycle seat; a first switch coupled to the electrical energy supply source and to the light emitting structure for connecting and disconnecting the electrical energy supply source with all of the light emitting diodes of the light emitting structure at the same time and continuously as long as the first switch is in an "ON" state connecting the electrical energy supply source to the light emitting diodes, and the array of at least three light emitting diodes being arranged closely adjacent to each other so that the simultaneous diverging light beams from each of the at least three light emitting diodes overlap the light beams from each adjacent light emitting diode, particularly the light beam from the light emitting diode(s) having a light emitting diode on either side thereof, thereby to provide a continuous, powerful, reinforced, generally rectangular in-cross section, light beam along the first line.

DESCRIPTION OF THE PREFERRED EMBODIMENT(S)

Figure 1:
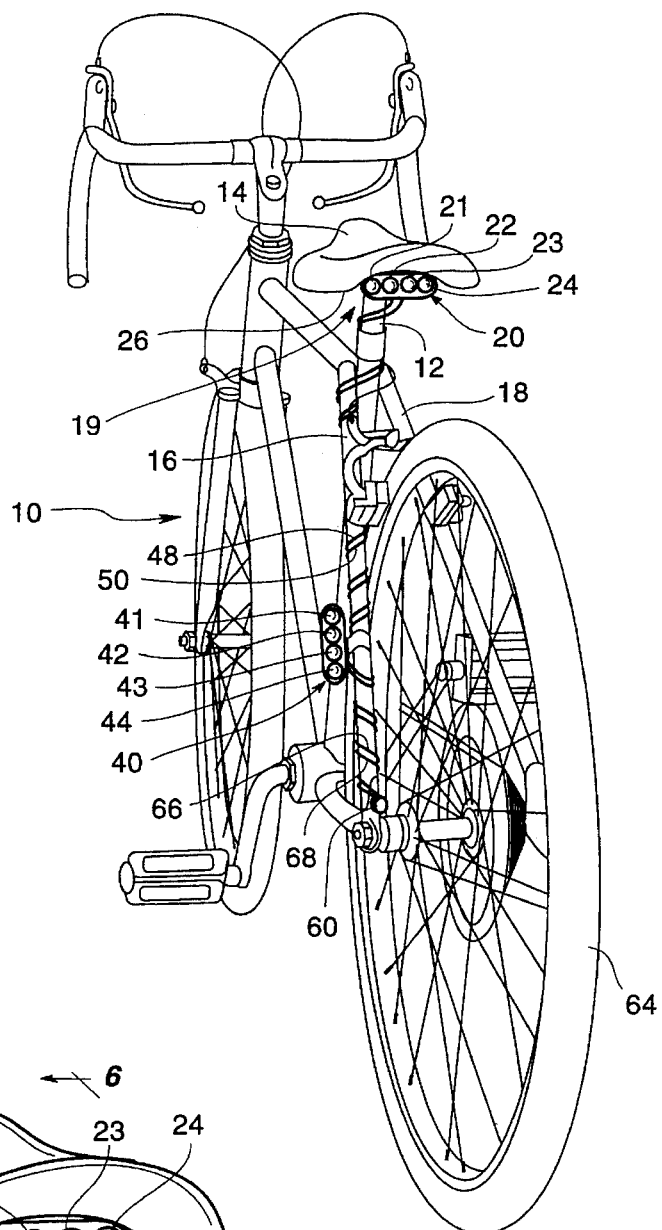
FIG. 1 is a rear perspective view of a bicycle showing the bicycle rear lighting system of the present invention including a generally horizontal array of four light emitting diodes, LEDs, mounted beneath a rear edge of the bicycle seat, a generally vertical array of four LEDs mounted to a seat stay a rear wheel framework, and a single LED mounted at the lower end of the seat stay adjacent the rear wheel axis.

Referring now to FIG. 1 there is illustrated therein a bicycle 10 having a seat tube 12 mounting a seat 14 and rearwardly and downwardly extending and diverging seat stays 16 and 18.

Figure 2:
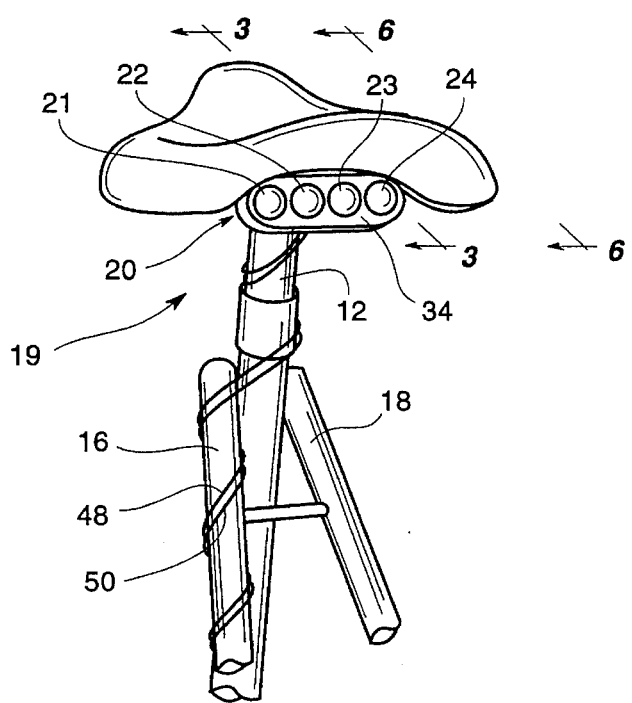
FIG. 2 is an enlarged fragmentary perspective view of the seat and the LED array mounted underneath the rear edge of the seat.

According to the teachings of the present invention a bicycle rear lighting system 19, or at least a portion thereof, is mounted underneath the seat 14 of the bicycle 10 and includes a linear array 20 of four light emitting diodes, LEDs 21, 22, 23, and 24 which are mounted beneath a rear edge 26 of the bicycle seat 14, as best shown in FIG. 2

Figure 3:
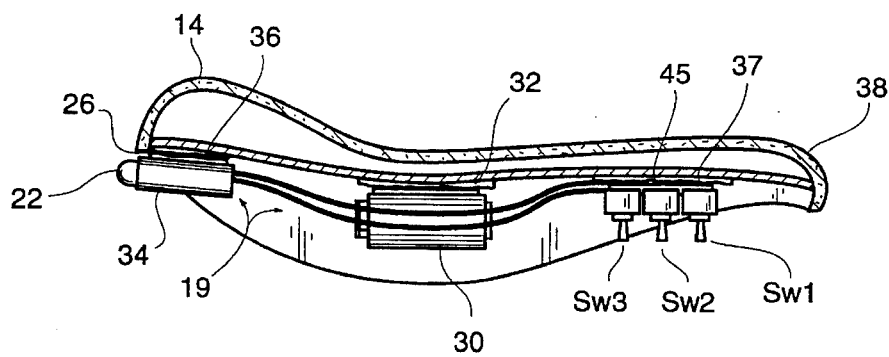
FIG. 3 is a vertical sectional view through the bicycle seat which is shown in FIG. 2 and which mounts therebeneath at least part of the bicycle rear lighting system of the present invention and is taken along line 3—3 of FIG. 2.
Figure 6:
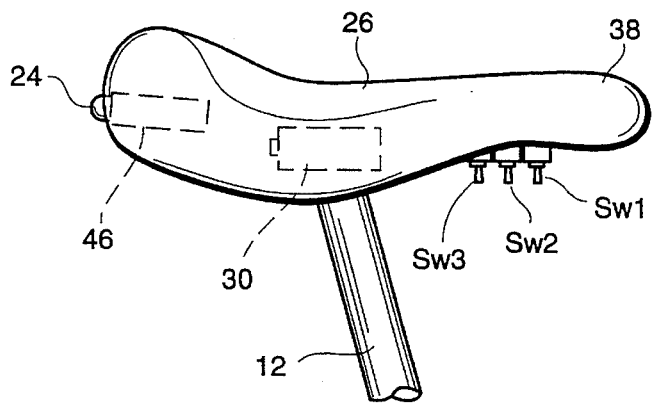
FIG. 6 is a side elevational view of the bicycle seat shown in FIG. 2 and is taken along line 6—6 of FIG. 2.

As shown in FIG. 3 and FIG. 6, the bicycle rear lighting system 19, or at least a portion thereof, is powered by at least two, 3 battery packs 30, i.e. two, AAA size batteries per pack. The packs 30 are connected in parallel and mounted by a hook and includes two 1.5 volt batteries 30 connected in series and mounted by a hook and catch fastening system 32 of the type sold under the trademark VELCRO. Also, the array 20 of light emitting diodes 21–24 are fixed in a holder 34 which is also fixed by a hook and catch type fastening system 36 sold under the trademark VELCRO under the rear edge 26 of the bicycle seat 14.

The bicycle rear lighting system 19 further includes at least one switch Sw1 mounted with cable ties 37 under a front portion 38 of the bicycle seat 14 for turning on or off the array 20 of light emitting diodes 21–24.

Figure 4:
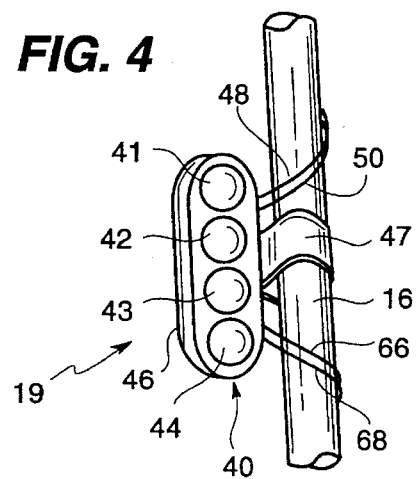
FIG. 4 is an enlarged fragmentary perspective view of the vertical array of LEDs mounted to one of the seat stays.

Preferably, the bicycle rear lighting system 19 of the present invention also includes a second array 40 of four light emitting diodes 41–44 mounted in a holder 46 which is clamped by a clamp 47 to the seat stay 16 as shown in FIGS. 1 and 4. Suitable wire conductors 48 and 50 (FIG. 4) extend up the seat stay 16 to the batteries 30 and to a second switch Sw2 mounted with cable ties 45 under the front portion 38 of the bicycle seat 14 for enabling the rider of the bicycle 10 to turn on and turn off this second array 40 light emitting diodes 41–44.

It will be noted that the first array 20 of LEDs 21–24 is located on or along a generally horizontal line and that the second array 40 of LEDs 41–44 is positioned on or along a generally vertical line.

Figure 5:
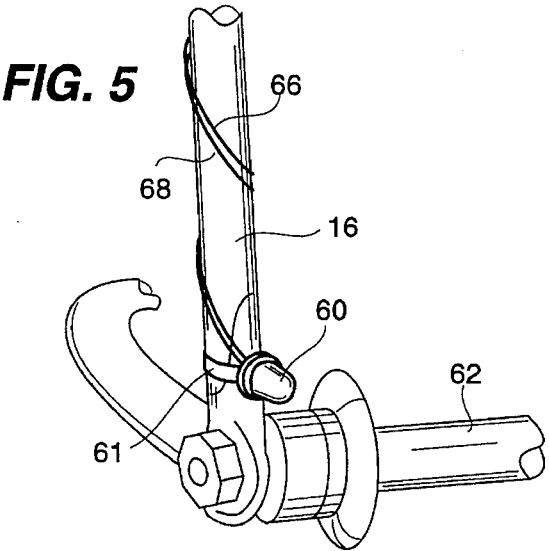
FIG. 5 is a fragmentary enlarged view of the single LED of the bicycle rear lighting system of the present invention.

Preferably the bicycle rear lighting system 19 also includes a single LED 60 which is mounted by a clamp, bond or piece of electrical tape 61 to the seat stay 16 at the lower end of the seat stay 16 adjacent to the axis of a rear axle 62 of a rear wheel 64 of the bicycle 10. Suitable wire conductors 66 and 68 (FIG. 5) connect this single LED 60 to the batteries 30 and to a third switch Sw3 mounted with cable ties underneath the front portion 38 of the bicycle seat 14.

Figure 7:
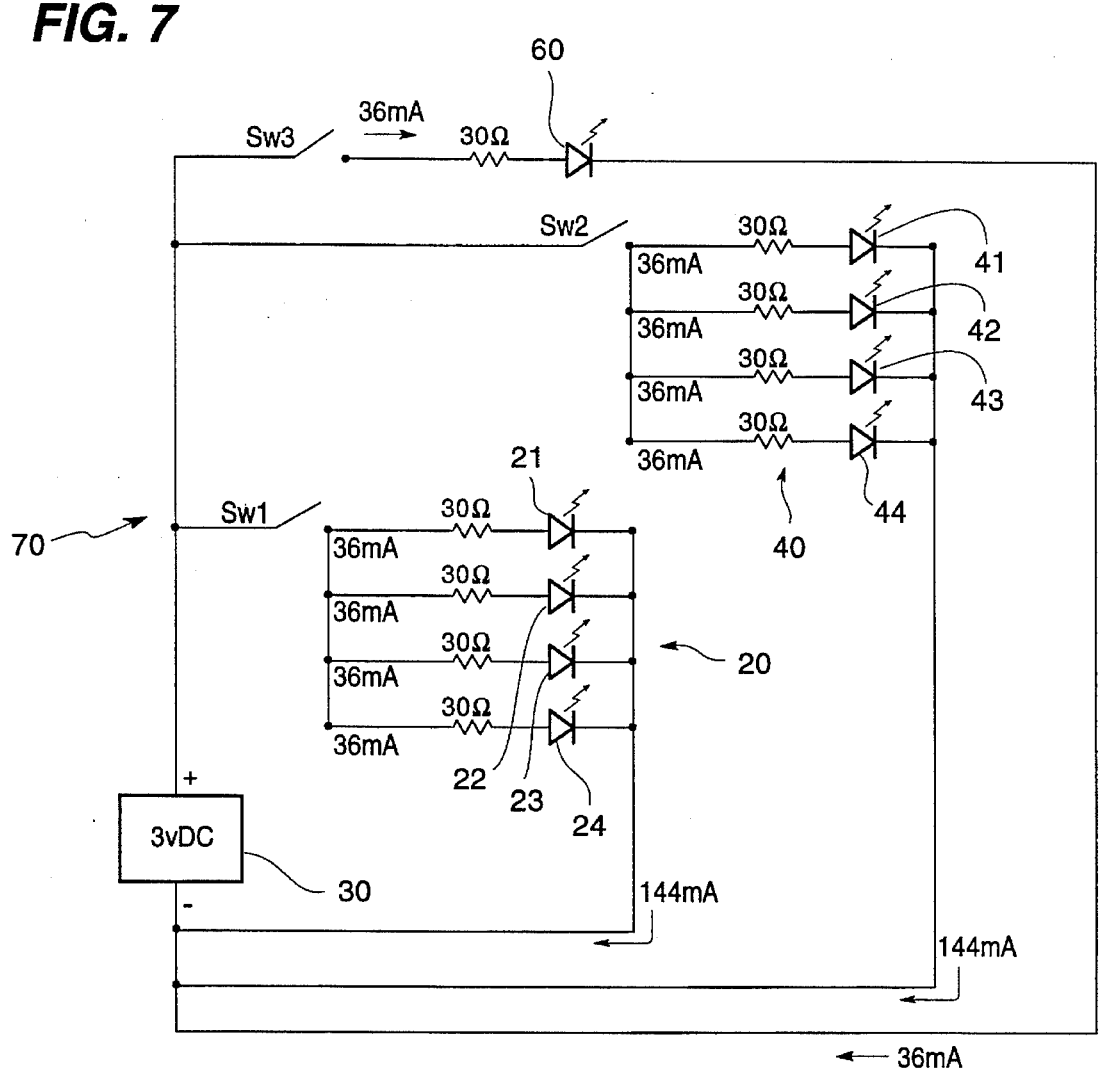
FIG. 7 is a schematic circuit diagram of the bicycle rear lighting assembly of the present invention.

An electrical circuit diagram of an electrical circuit 70 for the lighting system 19 is shown in FIG. 7. The electrical circuit 70 includes, in addition to (a) the battery or batteries 30, (b) the first array 20 of the diodes 21–24, (c) the switch Sw1, (d) the second array 40 of the diodes 41–44, (e) the switch Sw2 and (f) the single diode 60 and the switch Sw3, (g) a current limiting resistor of 30 ohms connected in series with each light emitting diode 21–24, 41–44 and 60 as shown. The three lighting circuits, namely the lighting circuit for the array 20, the lighting circuit for the array 40 and the lighting circuit for the single LED 60, are connected in parallel across the power supply of two batteries 30. The single LED 60 will draw 36 milliamps whereas the two arrays 20 and 40 of LEDs 21–24, or 41–44 each draw 144 milliamps.

Figure 8:
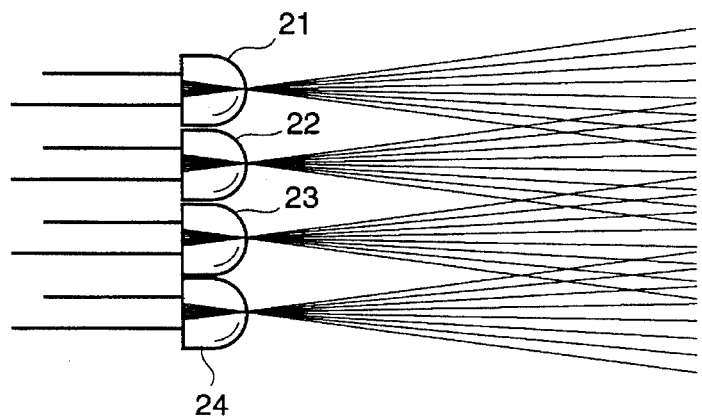
FIG. 8 is a side plane view of an array of four LEDs of one of the arrays of LEDs of the bicycle rear lighting system of the present invention showing the light beams from the LEDs overlapping each other.

Further according to the teachings of the present invention the light emitting diodes 21–24 in the first array 20 and the light emitting diodes 41–44 in the second array 40 are each positioned closely adjacent each other as shown in FIG. 8, whereby the light beam, which is emitted by each diode, e.g., diode 21, and which diverges slightly, will overlap with the light beam from the adjacent diode, e.g., from the diode 22, to provide a powerfull, reinforced, total light beam extending rearwardly of the bicycle 10 from a generally horizontal line or from a generally vertical line, respectively, thereby to enable an approaching vehicle to readily see the bicycle 10.

Also it will be appreciated that, by having two arrays 20 and 40 with one extending generally horizontally and one extending generally vertically, a cross of light will be seen at a distance by an approaching vehicle.

Further it will be appreciated that by providing the single light emitting diode 60, the rider of the bicycle 10 can open the switches Sw1 and Sw2 and merely close the switch Sw3 to provide a bright signal light or a warning light to an approaching vehicle when the batteries 30 have run down and have low voltage.

The LEDs 21–24, 41–44 and 60 are preferably superluminescent light emitting diodes also referred to as super ultrabright or high superbright LEDs. Typically such light emitting diodes are of the gallium, aluminum, arsenic type. Monochromatic red light emitting diodes sold under the trademark LUMEX-LITES are preferred.

From the foregoing description, it will be apparent that the bicycle rear lighting system 19 of the present invention has a number of advantages, some of which have been described above and others of which are inherent in the bicycle rear lighting system 19. Also it will be understood that modifications can be made to the bicycle rear lighting system 19 described above without departing from the teachings of the invention. Accordingly the scope of the invention is only to be limited as necessitated by the accompanying claims.

I claim:

1. A bicycle rear lighting system for mounting to an underside of a bicycle seat adjacent a rear edge of the bicycle seat comprising:

lighting means including a first linear array of at least three light emitting diodes which emit light along a first line;

first means for mounting said lighting means underneath the rear edge of the bicycle seat;

electrical energy supply means coupled to said lighting means;

second means for mounting said energy supply means to the underside of the bicycle seat;

first switch means coupled to said energy supply means and to said lighting means for connecting and disconnecting said energy supply means with all of said light emitting diodes of said lighting means at the same time and continuously as long as said first switch means is in an "ON" state connecting said electrical energy supply means to said light emitting diodes, and said array of at least three light emitting diodes being arranged closely adjacent to each other so that simultaneous diverging light beams from each of said at least three light emitting diodes overlap light beams from each adjacent light emitting diode, particularly a light beam from each light emitting diode having a light emitting diode on either side thereof, thereby to provide a continuous, powerful, reinforced, generally rectangular in-cross section, light beam along said first line.

2. The bicycle rear lighting system of claim 1 wherein said first linear array of light emitting diodes includes at least four, closely adjacent, light emitting diodes.

3. The bicycle rear lighting system of claim 1 wherein said first array of light emitting diodes are positioned to emit light along a generally horizontal line.

4. The bicycle rear lighting system of claim 1 including third means for mounting said first switch means underneath the bicycle seat.

5. The bicycle rear lighting system of claim 4 wherein said third mounting means mount said first switch means under a front portion of the bicycle seat.

6. The bicycle rear lighting system of claim 1 wherein each light emitting diode in said lighting system is connected in series with a current limiting resistor.

7. The bicycle rear lighting system of claim 6 wherein said energy source is a 3 volt dc battery source and each light emitting diode of said lighting system is a superluminescent LED.

8. A bicycle rear lighting system for mounting to an underside of a bicycle seat adjacent a rear edge of the bicycle seat comprising:

lighting means including a first linear array of two or more light emitting diodes which emit light along a first line;

first means for mounting said lighting means underneath the rear edge of the bicycle seat;

electrical energy supply means coupled to said lighting means;

second means for mounting said energy supply means to the underside of the bicycle seat;

first switch means coupled to said energy supply means and to said lighting means for connecting and disconnecting said energy supply means with said lighting means, and said array of two or more light emitting diodes being arranged closely adjacent to each other so that the diverging light beam from each light emitting diode overlaps the light beam from an adjacent light emitting diode thereby to provide a powerful, reinforced light beam along said first line, said first mounting means comprising a loop and catch type fastening system of the type sold under the trademark VELCRO.

9. A bicycle rear lighting system for mounting to an underside of a bicycle seat adjacent a rear edge of the bicycle seat comprising:

lighting means including a first linear array of two or more light emitting diodes which emit light along a first line;

first means for mounting said lighting means underneath the rear edge of the bicycle seat;

electrical energy supply means coupled to said lighting means;

second means for mounting said energy supply means to the underside of the bicycle seat;

first switch means coupled to said energy supply means and to said lighting means for connecting and disconnecting said energy supply means with said lighting means, and said array of two or more light emitting diodes being arranged closely adjacent to each other so that the diverging light beam from each light emitting diode overlaps the light beam from an adjacent light emitting diode thereby to provide a powerful, reinforced light beam along said first line, said second mounting means comprising cable tie means.

10. A bicycle rear lighting system for mounting to an underside of a bicycle seat adjacent a rear edge of the bicycle seat comprising:

lighting means including a first linear array of two or more light emitting diodes which emit light along a first line;

first means for mounting said lighting means underneath the rear edge of the bicycle seat;

electrical energy supply means coupled to said lighting means;

second means for mounting said energy supply means to the underside of the bicycle seat;

first switch means coupled to said energy supply means and to said lighting means for connecting and disconnecting said energy supply means with said lighting means, and said array of two or more light emitting diodes being arranged closely adjacent to each other so that the diverging light beam from each light emitting diode overlaps the light beam from an adjacent light emitting diode thereby to provide a powerful, reinforced light beam along said first line, including third means for mounting said first switch means underneath the bicycle seat, said third mounting means comprising cable tie means.

11. A bicycle rear lighting system for mounting to an underside of a bicycle seat adjacent a rear edge of the bicycle seat comprising:

lighting means including a first linear array of two or more light emitting diodes which emit light along a first line;

first means for mounting said lighting means underneath the rear edge of the bicycle seat;

electrical energy supply means coupled to said lighting means;

second means for mounting said energy supply means to the underside of the bicycle seat;

first switch means coupled to said energy supply means and to said lighting means for connecting and disconnecting said energy supply means with said lighting means, and said array of two or more light emitting diodes being arranged closely adjacent to each other so that the diverging light beam from each light emitting diode overlaps the light beam from an adjacent light emitting diode thereby to provide a powerful, reinforced light beam along said first line, said lighting system further including a second linear array of two or more light emitting diodes which are positioned closely adjacent each other so that the light beams therefrom overlap to provide a reinforced, generally rectangular in cross section, light beam along a second line which traverses said first line, second switch means for connecting and disconnecting said second linear array of light emitting diodes with said energy source, and fourth means for mounting said second array of light emitting diodes to the bicycle.

12. The bicycle rear lighting system of claim 11 wherein said fourth means for mounting said second array of at least two light emitting diodes to the bicycle includes a clamp for clamping said second array of diodes to a seat stay of the framework for the bicycle.

13. The bicycle rear lighting system of claim 11 wherein said second linear array of light emitting diodes includes at least four light emitting diodes.

14. The bicycle rear lighting system of claim 11 including fifth means for mounting said second switch means underneath the bicycle seat.

15. The bicycle rear lighting system of claim 14 wherein said fifth mounting means comprises cable tie means.

16. The bicycle rear lighting system of claim 14 wherein said fifth mounting means mount said second switch means under a front portion of the bicycle seat.

17. A bicycle rear lighting system for mounting to an underside of a bicycle seat adjacent a rear edge of the bicycle seat comprising:

lighting means including a first linear array of two or more light emitting diodes which emit light along a first line;

first means for mounting said lighting means underneath the rear edge of the bicycle seat;

electrical energy supply means coupled to said lighting means;

second means for mounting said energy supply means to the underside of the bicycle seat;

first switch means coupled to said energy supply means and to said lighting means for connecting and disconnecting said energy supply means with said lighting means, and said array of two or more light emitting diodes being arranged closely adjacent to each other so that the diverging light beam from each light emitting diode overlaps the light beam from an adjacent light emitting diode thereby to provide a powerful, reinforced light beam along said first line, said lighting system further including a single light emitting diode, sixth means for mounting said single light emitting diode on the bicycle framework near the axle for the rear wheel of the bicycle, and third switch means for coupling said single light emitting diode in series circuit relationship with said energy source.

18. The bicycle rear lighting system of claim 17 including seventh means for mounting said third switch means underneath the bicycle seat.

19. The bicycle rear lighting system of claim 18 wherein said seventh mounting means comprises cable tie means.

20. The bicycle rear lighting system of claim 18 wherein said seventh mounting means mount said third switch means under a front portion of the bicycle seat.

* * * * *